United States Patent
Stefan et al.

(10) Patent No.: US 10,300,927 B2
(45) Date of Patent: May 28, 2019

(54) METHOD AND DEVICE FOR A VEHICLE CONTROL PROCEDURE

(71) Applicant: FORD GLOBAL TECHNOLOGIES, LLC, Dearborn, MI (US)

(72) Inventors: Frederic Stefan, Aachen (DE); Erik Alpman, Aachen (DE); Urs Christen, Aachen (DE); Rainer Busch, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 366 days.

(21) Appl. No.: 14/923,901

(22) Filed: Oct. 27, 2015

(65) Prior Publication Data

US 2016/0114796 A1    Apr. 28, 2016

(30) Foreign Application Priority Data

Oct. 27, 2014  (DE) .................. 10 2014 221 835

(51) Int. Cl.
*B60W 50/14* (2012.01)
*B60W 50/00* (2006.01)
*B60W 30/14* (2006.01)

(52) U.S. Cl.
CPC .......... *B60W 50/14* (2013.01); *B60W 30/143* (2013.01); *B60W 50/0098* (2013.01); *B60W 2050/0075* (2013.01); *B60W 2520/10* (2013.01)

(58) Field of Classification Search
None
See application file for complete search history.

(56) References Cited

U.S. PATENT DOCUMENTS 6,018,692 A    1/2000   Shimizu et al.
6,059,063 A *  5/2000   Shimizu ............ B62D 15/0285
                                            180/204

(Continued)

FOREIGN PATENT DOCUMENTS

CN    102019917 A *  4/2011
EP    1327553 A3     8/2006

(Continued)

OTHER PUBLICATIONS

Girma S. Tewolde, Sensor and Network Technology for Intelligent Transportation Systems, IEEE Computer Society, May 6, 2012-May 8, 2012, 7 pgs.

Primary Examiner — Shelley Chen
(74) Attorney, Agent, or Firm — Frank A. MacKenzie; Brooks Kushman P.C.

(57) ABSTRACT

A method for a vehicle control procedure, wherein in the case of this vehicle control procedure a closed loop control of the vehicle velocity is performed on the basis of a predetermined desired value, may comprise the following steps: determining on the basis of at least one predetermined criterion whether in the case of the closed loop control the vehicle velocity leaves a value range that is defined by at least one velocity threshold value while taking into consideration a tolerance range that defines predetermined, permitted deviations from this value range; and implementing a corresponding measure while modifying the vehicle control procedure in dependence upon the result of this determination procedure, wherein the determination procedure is performed on the basis of a signal analysis of at least one measurement signal that describes the movement status of the vehicle.

3 Claims, 4 Drawing Sheets

(56) References Cited

U.S. PATENT DOCUMENTS

| | | | |
|---|---|---|---|
| 9,205,838 B2 | 12/2015 | Moore et al. | |
| 2002/0023818 A1* | 2/2002 | Yanaka | B60T 7/02 192/219.4 |
| 2003/0154014 A1* | 8/2003 | Iwata | B60K 31/10 701/93 |
| 2005/0194837 A1* | 9/2005 | Loring | B60L 7/26 303/155 |
| 2005/0264432 A1 | 12/2005 | Tanaka et al. | |
| 2007/0282502 A1* | 12/2007 | Bayer | B60W 10/04 701/42 |
| 2007/0288145 A1* | 12/2007 | Maeda | B62D 15/0285 701/41 |
| 2008/0167783 A1 | 7/2008 | Gierer et al. | |
| 2010/0211265 A1* | 8/2010 | Iwata | B62D 15/027 701/41 |
| 2010/0235050 A1* | 9/2010 | Iwata | B60Q 1/085 701/41 |
| 2012/0310459 A1 | 12/2012 | Schwitters et al. | |
| 2013/0096732 A1 | 4/2013 | Hagenme et al. | |
| 2014/0005904 A1* | 1/2014 | Chong | G08G 1/168 701/70 |

FOREIGN PATENT DOCUMENTS

| | | | |
|---|---|---|---|
| EP | 2266856 A1 | | 12/2010 |
| KR | 20140004411 A | * | 1/2014 |
| WO | 2013029054 A1 | | 2/2013 |

\* cited by examiner

METHOD AND DEVICE FOR A VEHICLE CONTROL PROCEDURE

CROSS-REFERENCE TO RELATED APPLICATION

This application claims foreign priority benefits under 35 U.S.C. § 119(a)-(d) to DE 10 2014 221 835.7, filed Oct. 27, 2014, which is hereby incorporated by reference in its entirety.

TECHNICAL FIELD

This disclosure relates to a method and a device for a vehicle control procedure. Although some embodiments can be used advantageously in particular in connection with a parking assistance system or when supporting a parking procedure, these and other embodiments can generally also be implemented in connection with any vehicle control procedure that involves a closed loop control of the longitudinal velocity of a vehicle.

BACKGROUND

Future parking assistance systems that are coming onto the market in the next few years will be able to park a motor vehicle automatically by virtue of the fact that they perform the lateral control (by means of steering) and the longitudinal control (by means of braking, actuating the gas pedal or actuating the gear switching lever) of the vehicle. These types of advanced driver assistance systems (ADAS="Advanced Driver Assistance Systems") are generally controlled by a controller or scheduler that coordinates the lateral control procedure and longitudinal control procedure.

The ADAS controller requires a defined vehicle velocity that is to be provided by the longitudinal control procedure. The ADAS controller monitors simultaneously whether the vehicle remains in a defined corridor with respect to an upper and lower threshold value for the vehicle velocity and also monitors the status of the longitudinal control procedure.

The longitudinal control procedure is designed or configured so as to maintain the vehicle velocity (V) in a predetermined value range ($V_{min} \ldots V_{max}$). It is possible to allow for the vehicle velocity values that lie in this range to be exceeded or for said values not to be achieved in each case for short time periods in order to render it possible for example to perform a maneuver at a curb side, as is illustrated in FIG. 1. However, in the event of these short time periods being exceeded, an appropriate reaction of the system is required.

DE 10 2009 058 139 A1 discloses inter alia a method and a device for a vehicle control procedure with respect to an object, wherein in order to approach the object more accurately the vehicle is moved up to a first distance from the object at a parking velocity that corresponds to the maximum driving velocity that can be achieved at the idling rotational speed, the vehicle is then maintained at this velocity and, after achieving the distance up to a second distance that corresponds to the stopping distance, said vehicle is braked until it comes to a standstill using a braking device.

EP 1 327 553 B1 discloses inter alia a parking assistance system and a method for the closed loop control of a parking assistance system, wherein the incline of a road surface is determined and wherein on the basis of the result of this determination the parking assistance is cancelled if the angle of inclination of the road surface is too steep.

With regard to further prior art, reference is made merely by way of example to U.S. Pat. No. 6,018,692 and EP 2 266 856 B1.

SUMMARY

It is an object to provide a method and a device for a vehicle control procedure, which renders it possible to reliably detect unexpected situations in which the vehicle control procedure is no longer able to maintain the desired vehicle velocity values, and also to render it possible where necessary to initiate corresponding suitable measures with a small outlay in relation to the apparatus.

The method for a vehicle control procedure, wherein in the case of this vehicle control procedure a closed loop control of the vehicle velocity is performed on the basis of a predetermined threshold value, comprises the following steps:

determine on the basis of at least one predetermined criterion whether in the case of the closed loop control the vehicle velocity leaves a value range that is defined by at least one velocity threshold value while taking into consideration a tolerance range that defines predetermined, permitted deviations from this value range; and implement a corresponding measure while modifying the vehicle control procedure in dependence upon the result of this determination procedure;

wherein the determination procedure is performed on the basis of a signal analysis of least one measurement signal that describes the movement status of the vehicle.

Certain embodiments in particular the concept of detecting defined operating states merely on the basis of a signal analysis at least of one measurement signal that describes the movement status of the vehicle. This can be performed by way of example with the aid of the deviations between a vehicle velocity desired value and the prevailing vehicle velocity value, the respective time integral of corresponding difference signals, etc.

In the case of the method, data from external sensors (for example with respect to distance information) is not required for this purpose. As soon as a defined operating status is verified in which the vehicle control procedure is no longer able to maintain the desired vehicle velocity values, the higher-level control procedure can propose or initiate a suitable counter measure (for example interrupt or terminate the respective maneuver, such as for example a parking maneuver, which is being supported by the vehicle control procedure).

One typical operating status that can be verified is the maneuvering of the vehicle against an unavoidable obstacle that had not been detected for example either by the driver or by the sensors.

In accordance with one embodiment, the difference between the vehicle velocity and the velocity threshold value is used as the measuring signal that describes the movement status of the vehicle.

In accordance with one embodiment, a time integral of the difference between the vehicle velocity and the velocity threshold value is used as the measurement signal that describes the movement status of the vehicle.

In accordance with one embodiment, the predetermined criterion includes the fact that a threshold value is exceeded or not achieved by means of the measurement signal for a predetermined minimum time period.

In accordance with one embodiment, an engine torque that is exerted in the vehicle is used as the measurement signal that describes the movement status of the vehicle.

In accordance with one embodiment, the measure that is implemented includes interrupting or terminating a driving maneuver that is supported by means of the vehicle control procedure.

In accordance with one embodiment, the measure that is implemented includes furthermore transmitting a query to the driver requesting whether the driving maneuver is to be continued or restarted.

In accordance with one embodiment, the vehicle control procedure includes assisting a parking maneuver.

In accordance with one embodiment, the measure that is implemented includes braking the vehicle until it comes to a standstill.

Some embodiments relate to a device for controlling the vehicle, wherein in the case of this vehicle control procedure a closed loop control of the longitudinal velocity of a vehicle is performed on the basis of a predetermined desired value for the vehicle velocity, wherein the device is designed so as to perform a method having the above described features.

DETAILED DESCRIPTION

Figure 1:
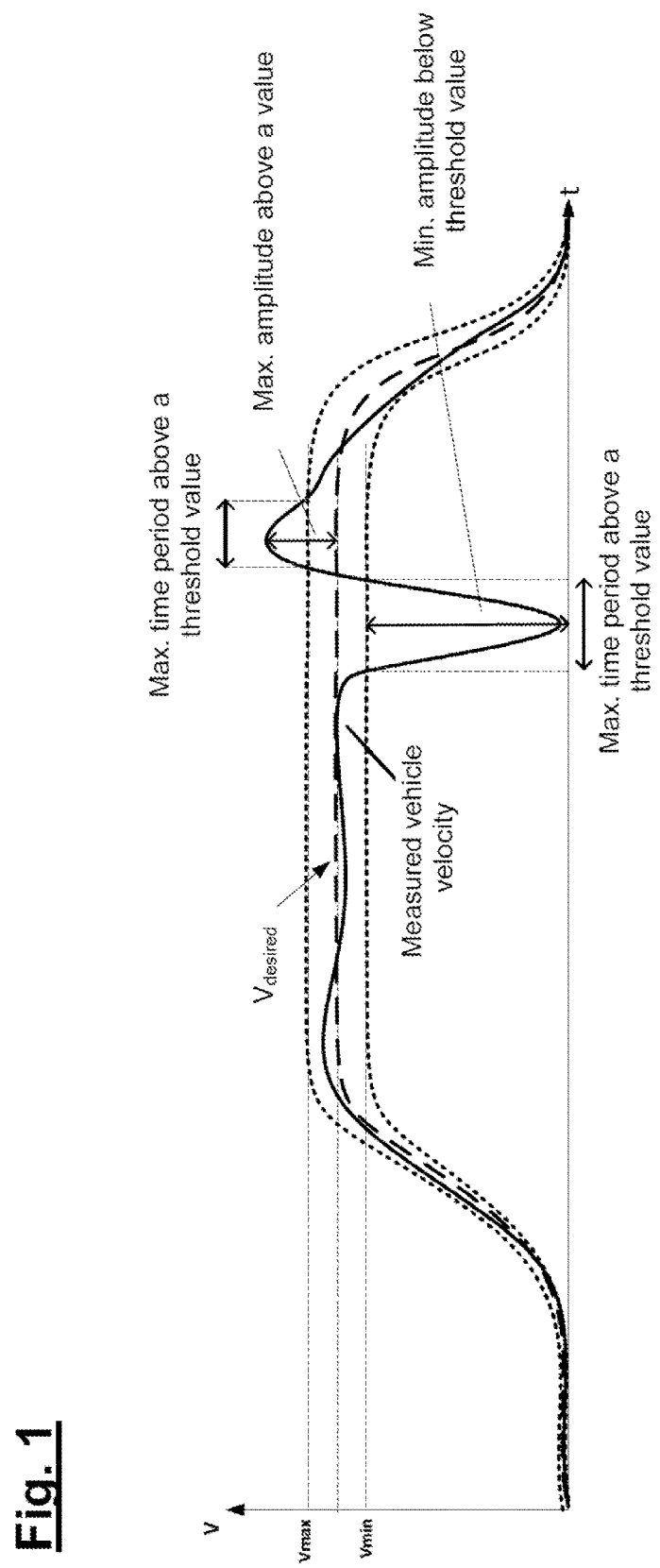
FIG. 1 illustrates a diagram in which are plotted in an exemplary scenario permissible variations of the vehicle velocity about the desired value for the vehicle velocity.
Figure 2:
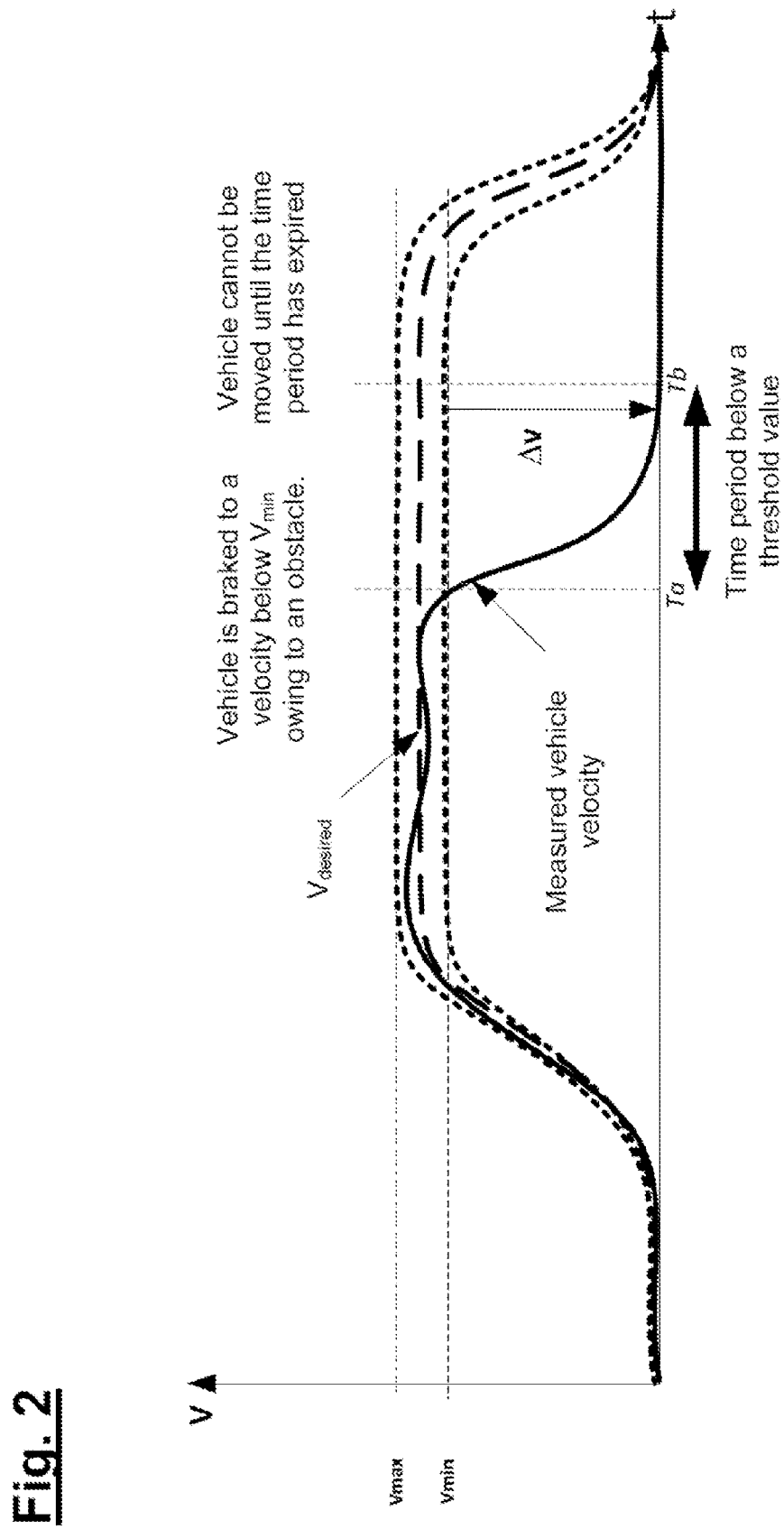
FIGS. 2-4 illustrate diagrams for explaining different scenarios in which the vehicle velocity leaves a defined value range ($V_{min} \ldots V_{max}$) for a time period that is above a defined value.
Figure 3:
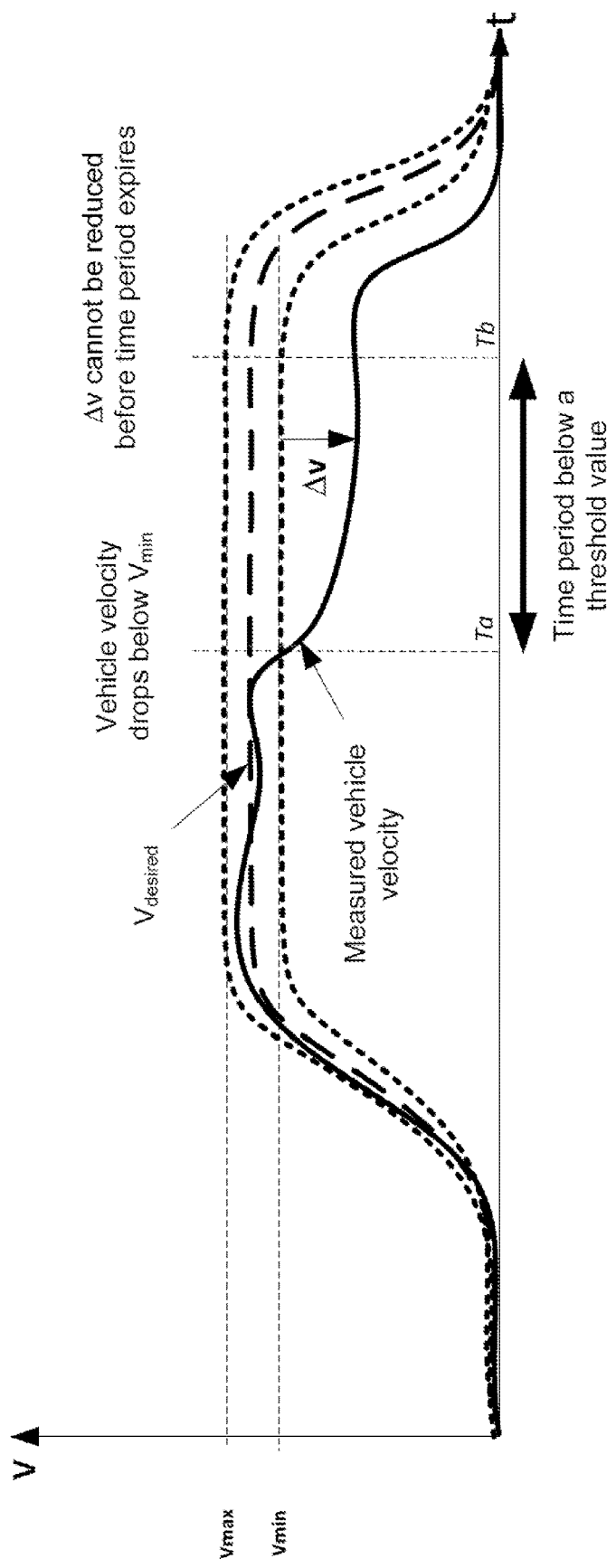
Figure 4:
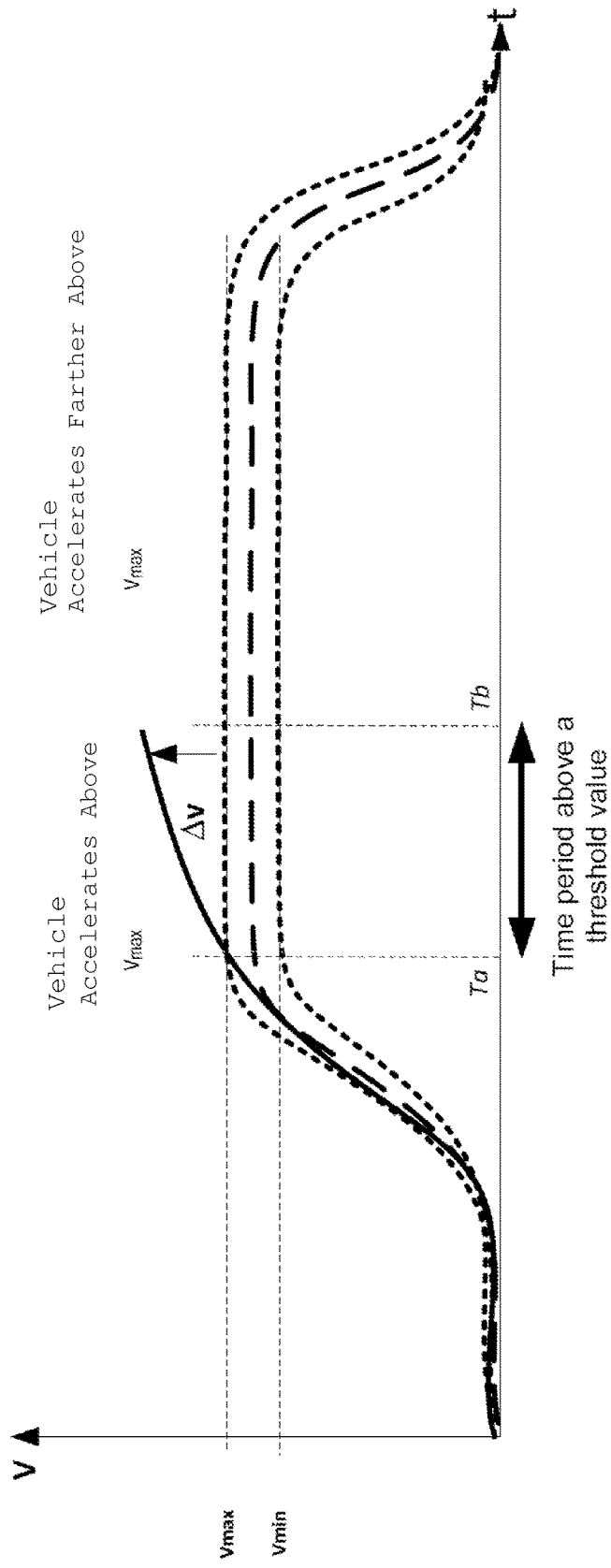

Furthermore, different scenarios are described with reference to FIGS. 2-4 and table 1, in which the vehicle velocity leaves a defined value range ($V_{min} \ldots V_{max}$) for a time period that is above a defined value. Table 1 also illustrates possible reactions of the system and also exemplary maneuvers in which the relevant situation can occur.

These scenarios have in common that in each case an operating status is detected in which an unexpected situation in which the vehicle control procedure is no longer able to maintain desired vehicle velocity values merely on the basis of a signal analysis at least of one measurement signal that describes the movement status of the vehicle and where necessary a suitable measure is initiated accordingly. This signal analysis can include by way of example the analysis of the deviation between a vehicle velocity desired value and the prevailing vehicle velocity value or the analysis of a time integral of corresponding difference signals.

In each case, a lower limit value $V_{min}$ for the vehicle velocity and/or an upper limit value $V_{max}$ for the vehicle velocity are predetermined to be constant or situation-dependent or also dependent upon the respective vehicle velocity (for example in a reference table as a percentage of the desired value for the vehicle velocity, etc.). The predefined time periods mentioned in each case in Table 1 can be listed in a reference table in dependence upon the prevailing vehicle velocity.

TABLE 1

| Situation | Verification Method | Possible Reaction | Exemplary Maneuver |
|---|---|---|---|
| 1 | $V = 0$ km/h and $V_{desired} >$ Threshold value for defined time period. V is below $V_{min}$ and $D = \int_{T_a}^{T_b}(V - V_{min})dt$ is below a threshold value, D is reset each time if V exceeds the value $V_{min}$. Maximum permissible engine torque (during parking maneuver) is exerted for a defined time period and $V = 0$ km/h. Integral of the torque exceeds threshold value. | The parking maneuver is interrupted and the driver is requested to check the situation wherein the driver can decide whether to restart or terminate the maneuver. The parking maneuver is terminated and the full control of the vehicle is returned to the driver. | The vehicle maneuvers against a low-standing object that has not been detected or could not be detected by the parking sensors and was difficult for the driver to detect (for example large stone, low wall, low metal railings etc.). |
| 2 | $0 < V < V_{min}$ for defined time period. $V - V_{min}$ is below a threshold value for a defined time period. V is below $V_{min}$ and $D = \int_{T_a}^{T_b}(V - V_{min})dt$ is below a threshold value, D is reset each time if V exceeds the value $V_{min}$. Maximum permissible engine torque (during the parking maneuver) is exerted for a defined time period. Integral of the torque exceeds threshold value. | The parking maneuver is interrupted and the driver is asked if he still wishes to continue with the maneuver. The parking maneuver is terminated (i.e. the vehicle is braked until it comes to a standstill) and the full control of the vehicle is returned to the driver. No special reaction of the | The vehicle is heavily laden and the maneuver is performed on a steep incline (for example, slope, curb stone, uneven ground etc.). |

TABLE 1-continued

| Situation | Verification Method | Possible Reaction | Exemplary Maneuver |
|---|---|---|---|
| | | system, the maneuver is continued since the vehicle is still capable of moving. | |
| 3 | $V > V_{max}$ for a defined time period. $V$ is above $V_{max}$ and $D = \int_{T_a}^{T_b}(V - V_{max})dt$ is below a threshold value, D is reset each time if V is below the value $V_{max}$. $V - V_{max}$ is above the threshold value for a defined time period. Integral of the torque exceeds threshold value and $V > V_{max}$. | The parking maneuver is terminated (i.e. the vehicle is braked until it comes to a standstill) and the full control of the vehicle is returned to the driver. | The vehicle is heavily laden and the maneuver is performed driving down a hill with a steep gradient (for example a sloping road, curb stone, holes in the road etc.). |

What is claimed is:

1. A method for controlling a vehicle comprising:
by a controller, during an automatic parking maneuver and in response to vehicle speed exceeding for a predefined period of time a maximum speed threshold defined by a desired speed for the parking maneuver, braking the vehicle to bring the vehicle to a standstill such that the automatic parking maneuver is interrupted or terminated, and returning full control of the vehicle to a driver of the vehicle.

2. The method of claim 1, wherein the braking is only performed in response to the vehicle speed exceeding for the predefined period of time the maximum speed threshold if an integral of torque exceeds a threshold torque during the predefined period of time.

3. The method of claim 1, wherein the returning includes alerting the driver.

* * * * *